United States Patent
Soni et al.

[11] Patent Number: 5,860,007
[45] Date of Patent: Jan. 12, 1999

[54] AUTOMATED SOFTWARE MODIFICATION FACILITATOR

[75] Inventors: Dilip Soni, Princeton; Michael Greenberg, Lawrenceville, both of N.J.

[73] Assignee: Siemens Corporate Research, Inc., Princeton, N.J.

[21] Appl. No.: 536,547

[22] Filed: Sep. 29, 1995

[51] Int. Cl.$^6$ ............................................. G06F 7/00
[52] U.S. Cl. .................................... 395/703; 395/182.13
[58] Field of Search ................................... 395/703, 708, 395/182.13, 182.14; 706/60

[56] References Cited

U.S. PATENT DOCUMENTS

| | | | |
|---|---|---|---|
| 4,918,620 | 4/1990 | Ulug | 364/513 |
| 4,943,932 | 7/1990 | Lark et al. | 364/513 |

FOREIGN PATENT DOCUMENTS 0 420 461   4/1991   European Pat. Off. .

OTHER PUBLICATIONS

"An Integrated Program Representation and Toolkit for the Maintenance of C Programs", Platoff et al. Proceedings Conf. on Software Maintenance 1991, Oct. 15–17, 1991, Sorrento, Italy, pp. 129–137.

"MACS: Maintenance Assistance Capability for Software A K.A.D.M.E.", Desclaux et al., Proceedings Conference on Software Maintenance 1991, Oct. 15–17, 1991, Sorrento, Italy, pp. 2–12.

"Improved Maintenance Support by Multi–Version Visualizations", Gulla, Proceedings Conference on Sofware Maintenance 1992, Nov. 9–12, 1992, Orlando, FL, pp. 376–383.

*Primary Examiner*—Frantzy Poinvil
*Attorney, Agent, or Firm*—Adel A. Ahmed

[57] ABSTRACT

Analysis, planning and interrelated modifications of a software system across modular architectural, language and documentation levels are automated and facilitated by use of the Change Assistant (CA). CA automatically analyzes the impact of the intended change on all levels, identifying related changes that may be needed to achieve the programmer's goal. When the plan is finalized and approved, CA automatically performs the change, modifying the code, as needed, to make it consistent with the changed architecture. Thereby, the need for human intervention in maintaining software is significantly reduced and the possibility of error minimized.

5 Claims, 6 Drawing Sheets

AUTOMATED SOFTWARE MODIFICATION FACILITATOR

TECHNICAL FIELD

This invention relates generally to the field of software maintenance, editing and modification, and, more particularly, to a method for automating the process of making modular architectural and source code changes to system software, thereby minimizing the time and the amount of human intervention necessary to complete such changes, as well as the number of errors usually resulting from implementing such changes.

BACKGROUND OF THE INVENTION

The maintenance of large and long-lived software systems is difficult and costly. Such software systems have been increasing in their size, number, and complexity. It has been estimated that up to 60% of the total cost of a software life cycle can be attributed to maintenance. This cost will increase as software assumes an ever more important role in products of all types. Software maintenance is difficult because it requires a high level of understanding of the system from a maintainer working in an unfavorable environment. The understanding process is hindered by the lack of design documentation. When such documentation is available, it is often incomplete or out of date. For a large system, it is a tedious and menial task to consider all the relevant details, even when they are complete and accurate.

Software maintenance includes activities such as documenting the system; enhancing existing functionality; finding and correcting bugs; rewriting, restructuring, and adapting software; and many other activities including testing and configuration management. One common characteristic of all the facets of software maintenance is "change." Changing large software systems is often tedious, error-prone and time-consuming. Even a simple modification request may result in many inter-related changes to a variety of software artifacts. For example, renaming a function requires checking for name conflicts, renaming all of the function's occurrences in code, design documents, related test routines and user manuals. These activities are tedious because a large number of similar, low level changes must be performed using only a text editor which often results in overlooked, required changes necessitating reiterative work at a later time. Moreover, there may be many alternative ways to fulfill a modification request. Each of these alternatives needs to be evaluated in terms of cost, the scale of its impact on other parts of the system and users, its relation to future modification requests and project management. This process is often informal and incomplete. It is also error-prone because software maintainers frequently do not understand all of the software artifacts and their interrelationships. Finally, performing the selected set of changes requires coordination among many project members and must be planned and managed for maximum effectiveness. Automation of the often tedious process of analyzing, planning and performing such changes is likely to reduce human error and improve productivity.

Further complicating such activities are the many interconnected types of architecture to which thought must be given when engaging in software maintenance. Conceptual architecture describes the system in terms of components representing its major design elements, and connectors representing interrelationships between components. The module interconnection architecture organizes the system into subsystems, modules and layers with details of exported and imported interfaces. The execution architecture describes the run-time architecture of the system in terms of tasks, threads, processors, and networks. The code architecture organizes code into files, directories, program libraries, and executables. Consideration of impacts on all of these areas is required when changes in software are contemplated.

Many advances have occurred in the field of software maintenance and editing. For example, efforts have been undertaken to enhance the composing, changing and integration of modules in a complex computer system comprised of multiple modules assembled within one framework and even between different frameworks, as disclosed in the patent to Lark, et al. (U.S. Pat. No. 4,943,932). But, this patent does not address the need for an efficient method for making modifications to one such module in a complex architecture and incorporating that change throughout the software system by automatically making changes in the architecture itself and, ultimately, in the source code of the originally changed and other modules to ensure that the resulting software is error-free. Of course, expert systems which incorporate a self-modifying reasoning capability, such as the patent to Ulug (U.S. Pat. No. 4,918,620), are known, but, again, such systems have not been successfully applied to the problem of modifying both the architecture and source code of complex modular computer software. The problem of source code modification in executing software in a distributed application architecture which is only partially heterogeneous was recognized in EP0420461A2, but the solution adopted was avoidance of the necessity of source code modification by packaging load modules and recompiling them at their target. Although all of these disclosures add significant improvements in their respective fields, they all suffer from either limited applicability to the problems solved by the subject invention or the requirement of substantial and repeated user intervention. What is needed is a software maintenance system which minimizes human intervention, thereby substantially reducing the cost, time and errors associated with previous efforts in this area.

SUMMARY OF THE INVENTION

The Change Assistant (CA) of the present invention improves the maintainer's understanding of software systems using views which facilitate programming-in-the-large by automating interrelated changes in module architectures. A view collects all important characteristics of a software system that are relevant to a particular perspective. For example, using the system architecture view, a maintainer can understand how the system has been structured, and how the modules are related to each other. The CA supports a comprehensive set of changes for each view of the system. Since the views are interdependent, whenever the maintainer makes a change to one view, the CA assists the user in changing the other views as well. The CA employs an English language thesaurus to allow maintainers to retrieve information using only informal descriptions. This is important when a maintainer is not familiar with the exact terms used in a software system.

The CA takes a goal-oriented approach towards understanding software systems. It addresses only those aspects of understanding that facilitate the task of making modifications. The CA formalizes each aspect of understanding in terms of a view of the software system. The set of views supported by the CA includes the text view, the programming language view, and the system architecture view. For each view, the CA defines a class of changes that are easiest to understand in that view. For each of these changes, the CA has developed a list of systematic steps that must be carried out before a change may be implemented.

The type of modification being performed determines the level at which a software system must be understood. For a language level change, the semantics of the programming language need to be understood. If the change is at the architecture level, the architecture of the system needs to be understood. If the change is at the behavioral level, one must understand how different behaviors are implemented in the system. For example, if one changes the name of a procedure, one only needs to understand the rules for scope and visibility in the programming language. If a procedure is to be moved from one module to another, the maintainer also needs to understand how the architecture of the system is translated into the structure of code. However, if the behavior of the procedure is changed so that it includes error-checking, the maintainer needs to understand how paradigms for error checking can be implemented.

The CA also helps the user to evaluate, plan, propagate and automate software changes related to programming-in-the-large, i.e. those which impact software on a global, as opposed to a localized, basis. Thus, CA assists in interactively planning changes to a system. It lets the user know when a change introduces new problems and suggests additional changes to fix those problems which are then added to the change plan. For certain types of changes, CA can guarantee that the program will behave identically before and after changes have been made. CA automatically changes code to correspond to the change plans from above. Such changes may effect the module interconnection architecture of a software system, the organization of its code, and the source code itself. The benefits of such an approach include reduction in the cost of code compilation and improved understanding for the maintainer of the code.

In order to facilitate planning and automation of changes, an Architecture Description Language (ADL) has been designed to describe the module interconnection architecture of a system and its relationship to the organization of source code. ADL can describe objects such as systems, modules and interface specifications, and relations such as import/export relations and mapping from architecture to source files and libraries. ADL is designed to describe both desired and actual characteristics of systems.

OBJECTS OF THE INVENTION

It is, therefore, a primary objective of this invention to provide a method for implementing changes in a complex software architecture composed of multiple modules wherein such changes occur substantially automatically on modular architectural, source code language and text documentation levels.

Another objective of this invention is to reduce the costs, time, errors and tediousness inherent in maintaining software systems by providing an automated software modification facilitator which substantially reduces the need for human intervention in many of the tasks involved in performing software maintenance.

A further objective of this invention is to extend the useful life of existing software systems so as to improve the competitive position of the company using such software.

Yet another objective of this invention is to dramatically improve the productivity of software maintainers, enabling them to complete their work more quickly and with fewer errors than previously possible.

Still a further objective of this invention is to improve the ease of maintainability of software systems.

An additional objective of this invention is to automate the process of analyzing, planning and performing changes in complex system software thereby facilitating programming-in-the-large.

DESCRIPTION OF THE PREFERRED EMBODIMENT

Figure 1:
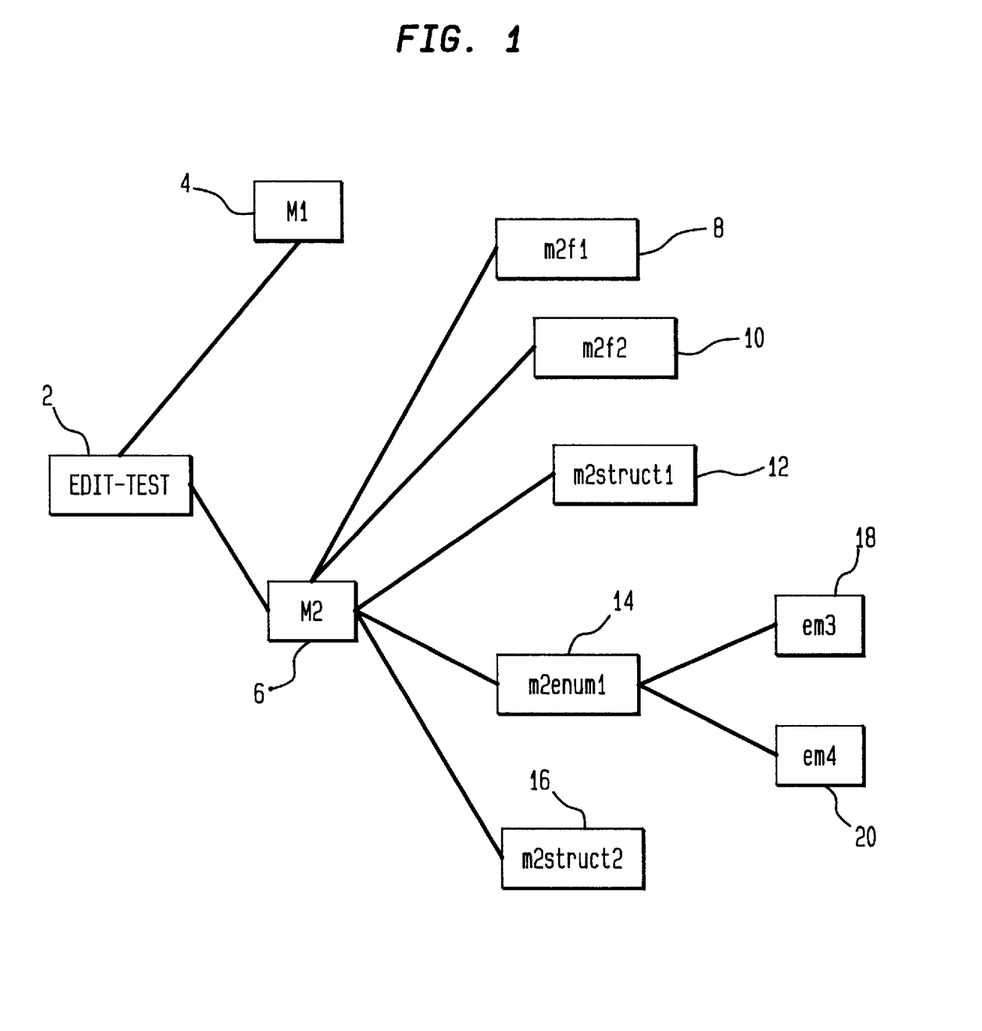
FIG. 1 is a graphical representation of an architectural view of a simple system according to the invention.

The CA improves understanding of software for the maintainer by presenting separate "views" of the software system, including a system architecture level view, a language level view and a text level view. For a more detailed understanding of the invention, reference is first made to FIG. 1 of the drawings. This figure illustrates a graphical presentation of an architectural view of a simple system. This view consists of a system decomposition from system EDIT-TEST 2 to modules M1 4 and M2 6, to individual program units 8, 10, 12, 14, 16, 18 and 20. CA defines an architecture unit (AU) as referring to all architectural constructs which include systems, modules and abstract datatypes. A program unit (PU) refers to objects that occur at the language level. Functions, variables and structures are examples of PU's. The components of an AU can be other AU's or PU's. The components of a PU can be other PU's. In FIG. 1, for example, 8 and 10 are functions, while 12 and 16 are structures and 14 is an enumeration with two components 18 and 20.

The system architecture view is used to describe and represent in modular form the architecture of software from the systems level to the code level. The requirements for this view were derived from studying the architecture of a software system with 40,000 lines of code. The system architecture of a system can be described in terms of entities and relations. The entities include nested systems and modules, systems libraries, abstract data types, module interface definitions, and program units such as procedures, data types, and variables. Relations defined on these entities include is-component-of, imports, exports, calls, and uses. The system architect may additionally specify constraints on these relations to manage complexity of interactions between various systems modules. For example, he may specify that procedures from a particular module can only call procedures from modules at the same or adjacent levels. The CA provides commands to check that import/export relations are consistent with respect to such constraints.

Moreover, the CA supports commands that merge or split system modules. These commands are available through graphical as well as command line interfaces and are displayed hierarchically in the initial system architecture view. The CA has been implemented in Common Lisp to run on a Sun SPARC workstation using a transformation program tool to extract information from programs written in the 'C' language, although its use is not limited to this configuration. Since 'C' does not directly support many of the architectural concepts such as nested modules and module interaction constraints, the CA has defined common methods of implementing these concepts in 'C'.

The language level view presents a description of the characteristics of program units (PU's) such as procedures, types, and variables. Associated with each program unit is its abstract syntax tree, and its symbol table information. Symbol table information includes attributes such as name, type, scope, and visibility of program units. Additionally, cross-reference relations between program units are also maintained. For example, it is possible to answer questions about who calls a particular procedure or which procedures are called by it. This information is integrated with the system architecture view. Thus, the user can select the level of abstraction at which to view the cross-reference information. For example, the user can decide to display callers of a particular procedure at the level of procedures, modules, or subsystems. This is a natural and meaningful way to reduce the size of relevant information. CA also supports commands that change name, scope, visibility, and type of PU's. Commands to reorganize code at the file level are also supported. Such commands merge, split, or rearrange 'C' files. Again, these changes are displayed as classes at the initial language level view. For each type of PU, the CA must resolve the following issues in order to analyze and implement any changes at the language level:

1) Visibility Levels—What are the levels at which a PU is visible? For example, in 'C' a 'static' function is visible only at the file level while an 'extern' function is visible at the program level.
2) Identifier Reusability—Is it possible to reuse the identifier associated with a PU? For example, the name of an 'extern' function cannot be reused while that for a 'static' function can be reused in a different file.
3) Separate Declaration—Is it possible to make the unit accessible to its users with the help of a separate declaration? For example, one can use forward function declarations to define mutually recursive functions.
4) Location of Definition—Is there a restriction on where the definition for the program unit can be located? For example, definitions of functions can only be at the file level.
5) Sharing Across Files—What is the mechanism for sharing a PU across different files in a program? For example, an extern function can be made accessible using an extern declaration in either a ".c" or an ".h" file. The interrelationship of these issues for different PU types is presented below in Table 1, following this specification.

TABLE 1

The text level view provides information regarding the documentation of the system. If documentation is modified, corresponding changes are automatically made to interrelated levels of the system. The reverse is also true.

To be useful, all such views of understanding must be meaningful not only to software maintainers but also to the CA. For this purpose, they must be representable and analyzable. A correspondence relation must exist between each view and code because not all aspects of a view may be directly supported by a programming language. For example, as mentioned above, nested modules are not supported by C. Developers often use design guidelines and coding conventions to implement nested modules. The correspondence between the architecture view and the code is essential to automatically check adherence to these guidelines. In order to facilitate planning and automate display of the correspondence between architecture and code, an Architecture Description Language (ADL) has been designed. ADL describes objects such as systems, modules and interface specifications, and relations such as import/export relations and mapping from architecture to source files and libraries. ADL is designed to describe both desired and actual characteristics of systems. For example, import/export relations describe the desired specification of how logical modules interact with each other while the use relation describes the actual interaction in code. CA provides correspondence and consistency analysis to check whether the code is consistent with the specified ADL representation. The information is also used to help a person understand the system being maintained. The CA supports a graphical browser to display the various views of a software system, and relationships between them. Commands are available to check consistency of code with respect to each view.

Figure 2:
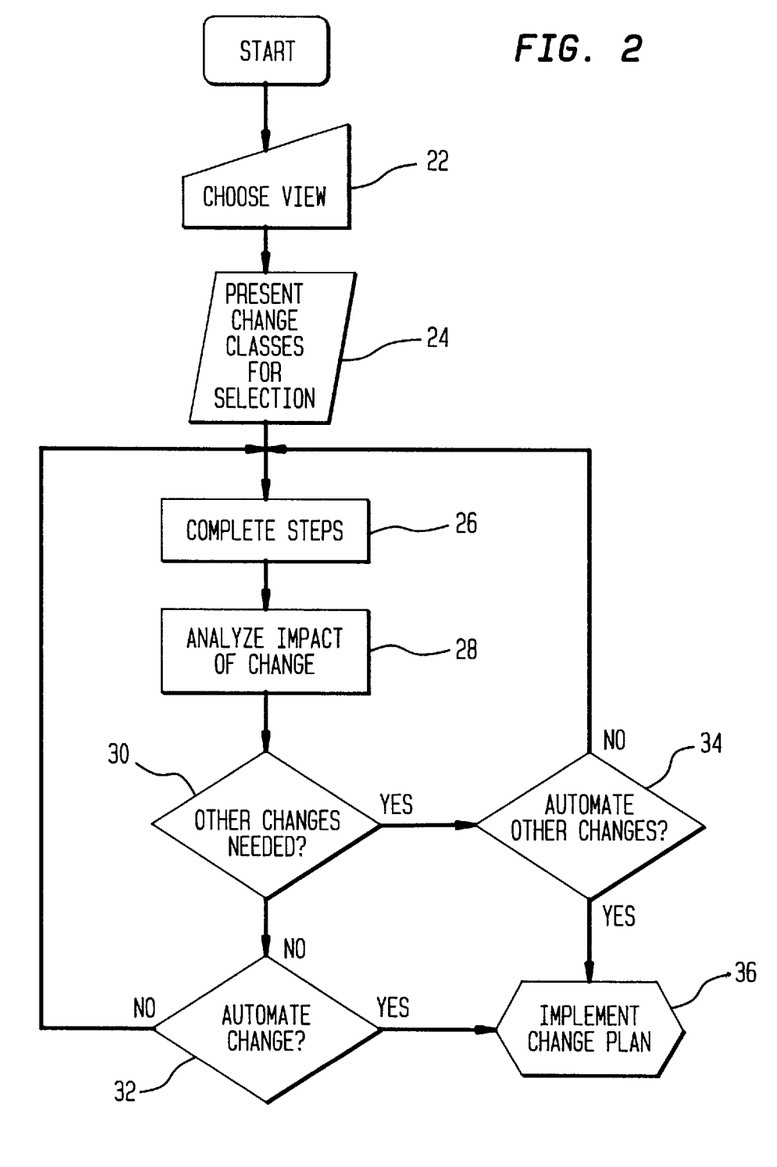
FIG. 2 is a schematic flow chart depicting the data processing and operational steps of the invention.

To further clarify the invention, reference is now made to FIG. 2. This figure illustrates in flow chart form the processing steps and functions performed by the Change Assistant (CA) of the present invention. The maintainer is presented at step 22 with choices of whether to display an architectural level, language level or text level view. By means, for example, of a keyboard or pointing-type device such as a mouse, the maintainer selects which of the views is desired.

After a desired view has been chosen, the CA presents to the maintainer at step 24 a class of changes appropriately related to the chosen view. For the architectural system view, such classes may include lexical, decomposition, syntactic and interconnection. For the language level view, the relevant classes include lexical, visibility, location, file and syntactic. For each class, the CA presents a group of systematic procedures that must be carried out at step 26. Although some of these steps may require user intervention, most are automated by the CA with the help of program transformations, allowing the maintainer to focus on more challenging tasks. There are several types of changes available:

1) Architecture level changes which include splitting or merging modules and export/import specifications;
2) Source Code Organization level changes which include moving program units from one file to another, renaming a program unit or a file, and splitting or merging files;
3) Architecture to Code organization level changes which include splitting a module across several files; and
4) Code level changes which include the addition of parameters to or the deletion of parameters from procedures, or splitting and merging procedures.

All of these changes are interrelated in the sense that one category of change may lead to changes in other categories. For example, changing the import/export specification for a module may imply a change in the corresponding interface files. Splitting or merging of files may imply, at the very least, a change in how modules are mapped to source files. Change selection is best done by the maintainer since it requires a good understanding of the system.

Certain questions must be universally posed, answered and resolved, regardless of the type of change sought. These include: in language syntax, whether there is an illegal location or illegal identifier name; in uses relations, whether the used resource is no longer accessible, ambiguous or different; in used by relations, whether the unit is no longer accessible to users, whether two units with the same name become accessible to users and whether the unit accessible to users is different; in coding/naming conventions, whether the name does not conform to the naming convention; and in the association relationship between comments and code, whether the comment is deleted, or whether the comment is not moved with the associated program unit or whether an ambiguous or unknown association between comment and code has been created. CA handles all of these issues and, in addition, allows for semantically erroneous change requests by the maintainer.

Two examples will illustrate what is involved. When the name of a procedure is changed, the following steps must be carried out:

check for name conflicts in the defining module;
generate a list of all callers;
check for name conflicts in each of the calling modules;
change the name at the definition site;
change the name at each declaration site;
change the name at each call site; and
change the name in each import/export specification Table 2, which follows this specification, shows the context of the impact of a name change narrowed down to the file level.

TABLE 2

If the location of a procedures is being changed, the following steps are necessary:

check for name conflict in new file;
move definition from old to new file;
check for visibility of the procedure to callers;
check accessibility of resources used by procedure in new file; and
move declaration from old ".h" files to new ".h" files.

Table 3, which follows this specification, shows the context of the impact of a a location change narrowed down to the file level. All of the steps enumerated in the examples above are automated after the user identifies the procedure and its new name or location.

TABLE 3

Once a change has been selected and the required steps completed, CA analyzes the impact of the change at step 28 to find potential problems created by making the change and then proposes additional changes, as required, to repair those problems. Even a simple change to one part of a system may have a great impact on the rest of the system. In a case study of a system with 160,000 lines of ADA code, a deletion of a member in a record structure had an impact on 33 different sites in 16 different packages. CA uses a variety of analysis techniques to determine the impact of different classes of changes. These techniques include data and control flow analyses, cross-reference analysis, and cluster analysis. It uses the correspondence analysis to propagate changes in one view to changes in the other views of the software system.

Then, a decision is made at step 30 if there are potential problems created by making the change, necessitating still other changes. In the event there are no other required changes, execution proceeds to step 32 for a decision whether the change can be made in an automated fashion. If other changes are needed, at step 34, another decision is made whether these additional changes can be performed in an automated manner. If either the original and/or any subsequent changes cannot be automated, CA returns to step 26 to request manual entry by the maintainer to complete whatever steps are necessary to make the change successful and consistent. User intervention is required when there is a choice of applicable modifications, or when the CA does not know how to suggest or perform the applicable modifications, or when the change is illegal according to the language. User intervention is optional when there is only one applicable choice and if the CA knows how to perform it. CA presents alternative course of action to the maintainer in graphical object form, enabling the maintainer to optionally select the desired action by simply moving a pointing device, such as a mouse, to the object and clicking on it. Due to the interdependency of changes, this process is repeated until all problems are solved. If both the original change and/or any additional changes can be completed by the CA alone, a successful change plan has been created which is implemented across all levels of the software system in step 36.

Figure 3:
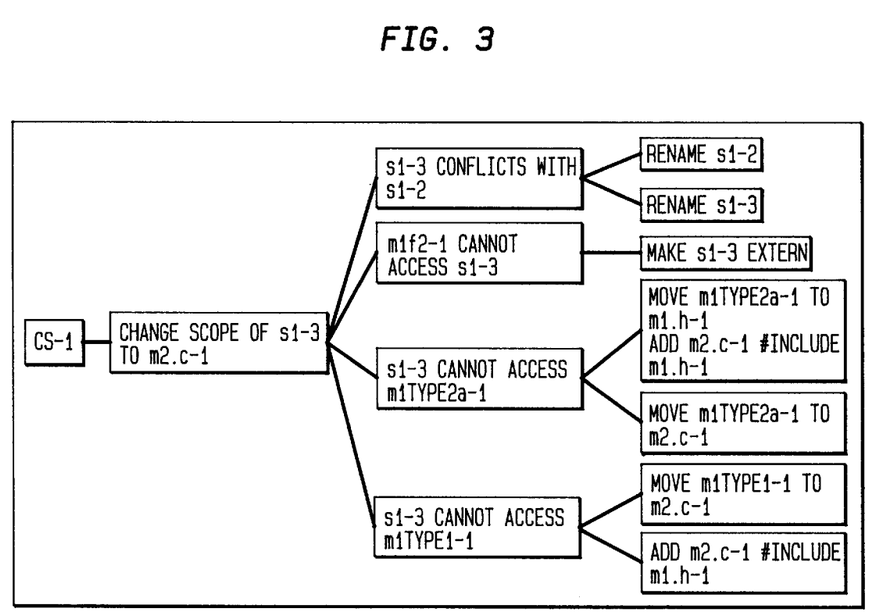
FIG. 3 is a graphical representation of a display screen representing the results of a validity check of a proposed software change made according to the invention.

For an actual example of the operation of the CA, reference is necessary to FIGS. 3 through 7 which together illustrate a typical user scenario with the Change Assistant in the form of sequential object-oriented displays on a monitor screen. Assume the existence of a 'C' program consisting of five files: m1.c, m1.h, m2.c, m2.h and m3.c. The process starts when the user submits a request to move the function s1-3 from m1.c to a new location m2.c. When s1-3 is moved, CA checks to make sure there are no name conflicts, all objects used by s1-3 are visible, and that s1-3 is still visible to everything that uses it. The results of this check are displayed on a CRT as shown in the FIG. 3. The proposed change, Change Statement 1 (CS-1), would generate the following four exceptions with the accompanying responses from CA, all of which are also illustrated in FIG. 3:

1) "s1-3 conflicts with s1-2"—In this system, there are three functions named s1. These functions are referred to as s1-l (in m2.c), s1-2 (in m3.c), and s1-3 (in m1.c). Initially, s1-2 and s1-3 are static, so there are no name conflicts. When s1-3 is moved to m2.c, a name conflict is introduced. CA then suggests that this problem can be repaired by renaming one of the offending objects.

2) "m1f2-1 cannot access s1-3"—The function m1f2-1 (in m1.c) can no longer call s1-3 because s1-3 is static. CA suggests making s1-3 external to resolve this problem.

3) "s1-3 cannot access m1type 2a-1"—The type m1type2a-1 (in m1.c) is no longer accessible to s1-3 once it is moved. CA suggests two possible remedies: m1type2a-1 can be moved into m2.c or m1type2a-1 can be moved to m1.h and m2.c can then include m1.h.

4) "s1-3 cannot access m1type1-1"—This error occurs because m1type1-1 is defined in m1.h and m1.h is not included by m2.c. CA suggests either moving m1type1-1 to m2.c or adding the appropriate include statement to m2.c.

Figure 4:
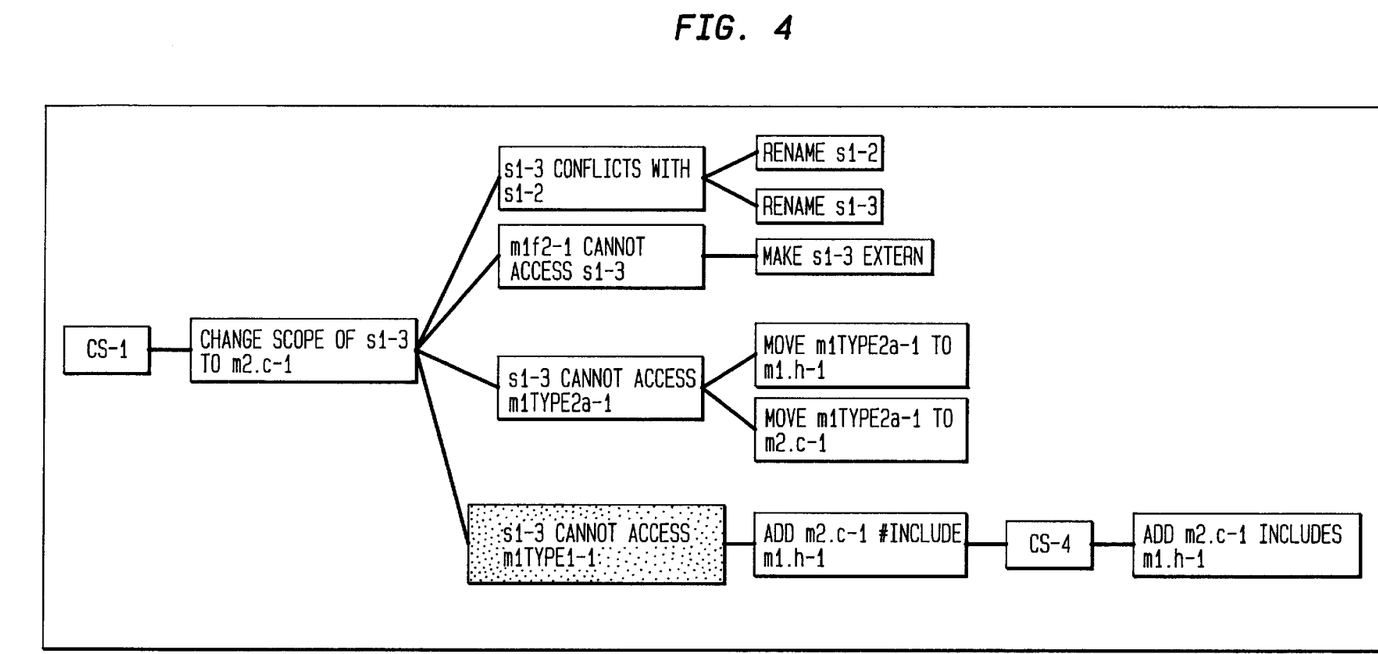
FIG. 4 is a graphical representation of a display screen representing the results of an attempt by a user to correct an error using the method of the invention.

Suppose the user decides to repair the exception "s1-3 cannot access m1type1-1" by adding the include statement. The user selects the error handler and the graph in FIG. 4 is displayed. Several things have altered. The change "Add m2.c includes m1.h" has been added to the graph. The original exception has been shown inverted to indicate that the exception has been resolved. Also, one of the remedies for "s1-3 cannot access m1type2a-1" has changed because the include statement has been added. A single change may affect how unrelated errors can be repaired. The implication of this is that after any change is made, the remedies for all exceptions must be recomputed.

Figure 5:
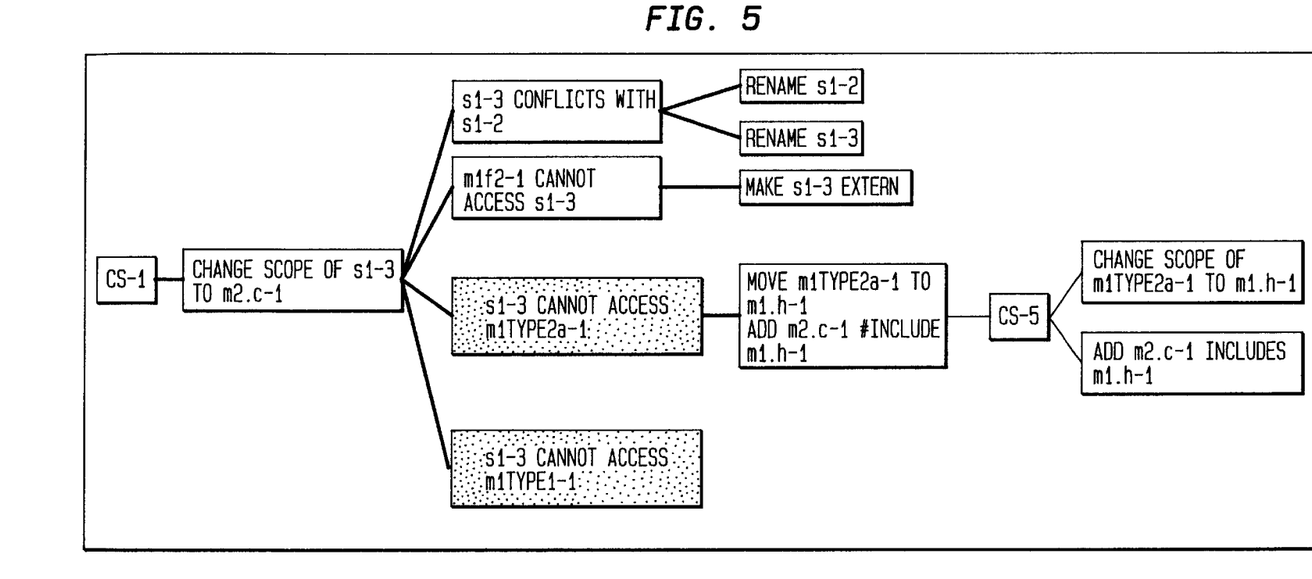
FIG. 5 is a graphical representation of a display screen representing the results of an attempt by a user to correct another error using the method of the invention.
Figure 6:
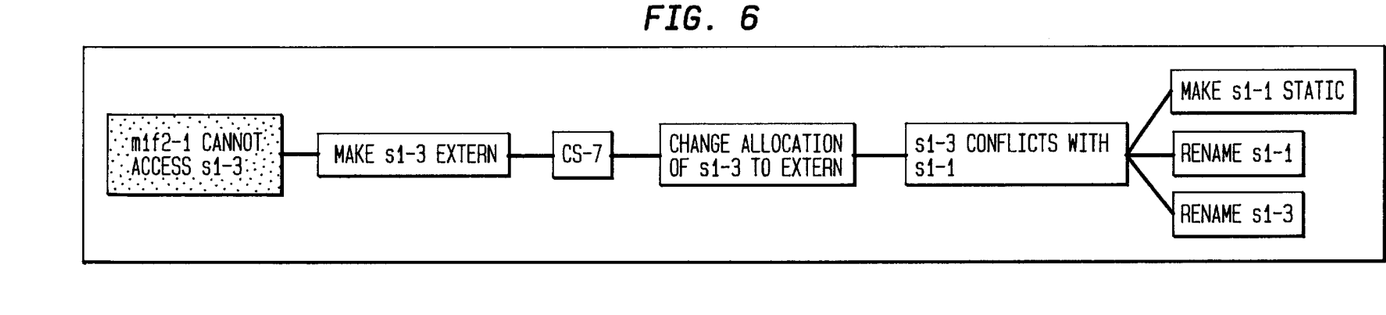
FIG. 6 is a graphical representation of a display screen representing the results of an attempt by a user to correct still a further error using the method of the invention.

Suppose that instead of choosing "Move m1type-1 to m2.c-1", the complex remedy for "s1-3 cannot access m1type2a-1" were chosen. The resulting graphic display is shown in FIG. 5. Two changes have been added to the graph which are collected together in CS-5 (change set 5). Also notice that the error "s1-3 cannot access m1type-1" has been resolved. This is because the selected change happened to repair that error. A single change may repair multiple errors. This implies that after every change all exceptions must be reexamined to see if they still apply.

To fix the error "m1f2-1 cannot access s1-3", the user decides to make s1-1 external. When this is done the graphic display of FIG. 6 results. Notice that fixing this error introduces a new error. Since there was already another external object named s1-2 (in m3.c), a new name conflict arises. A change taken to repair one error may cause other errors. This means that the entire planning process must take place after any change is made.

Figure 7:
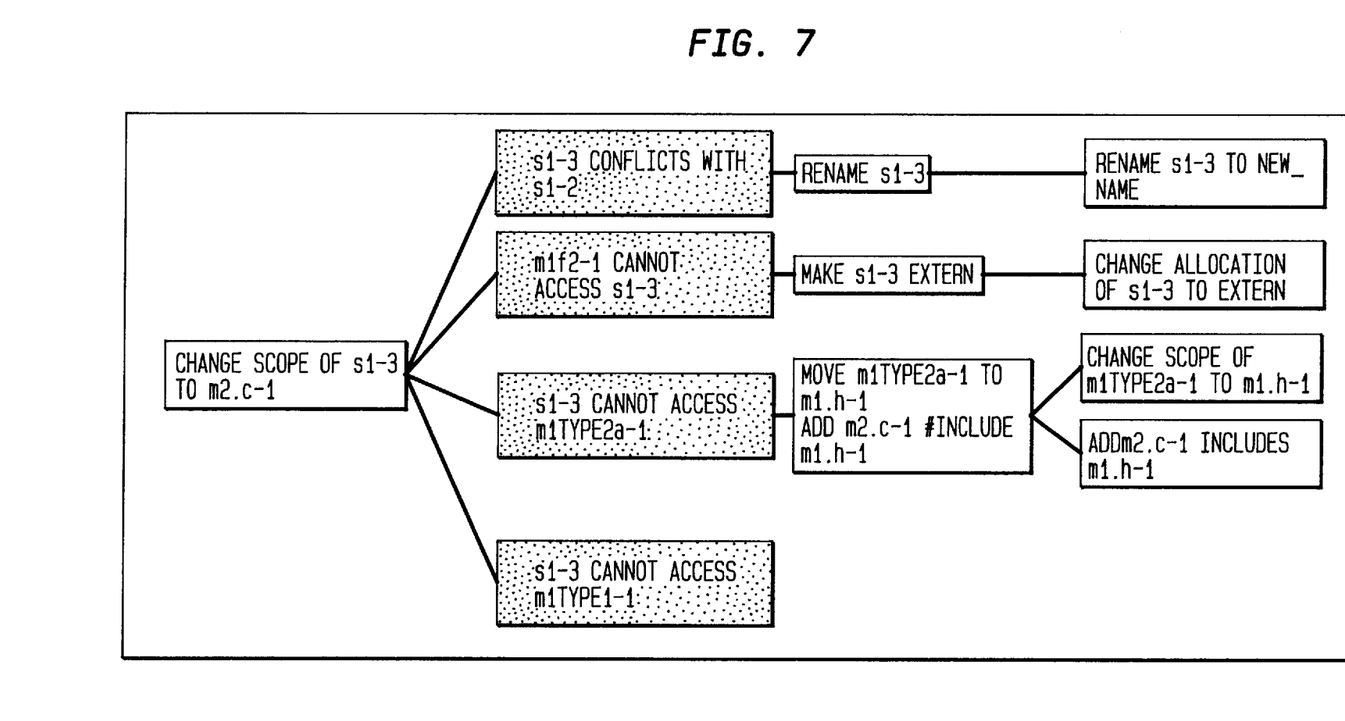
FIG. 7 is a graphical representation of a display screen representing the results of an attempt by a user to correct a different error using the method of the invention.

The remaining errors can be repaired by selecting "Rename s1-3". When this is selected, the user is asked for the new name. The graphic display of FIG. 7 shows the result. At this point, all the errors have been resolved, a successful change plan has been created, and the user can request CA to modify the source code. CA does this in two steps: First, the changes are analyzed to see if there are any interdependencies. For example, if two objects are to be moved into the same file, CA must determine the order in which they must appear. If one object uses the other, the ordering is important. Once that analysis is complete, CA creates source-to-source transformations to perform the change plan.

TABLE 1

| Program Unit | Visibility Levels | Identifier Re-usability | Separate Declaration | Location of Definition | Sharing across files |
|---|---|---|---|---|---|
| Function | file program | no for global per file for static | forward extern | file scope once per file | extern decls in .c or .h files |
| Macro | file position file program | No restrictions | No | No restrictions | defn. in .h files |
| Variable | nested blocks function file program | In different scopes | extern | any scope | extern decls in .c or .h files |
| Type | nested blocks function file program | In different scopes | No | any scope | defn in .c or .h files |
| Typedef | nested blocks function file program | In different files | No | any scope | defn in .c or .h files |

TABLE 2

| Change | Case | Context |
|---|---|---|
| Name of Function F | static in file1.c | file1.c |
|  | static in file1.h | file1.h |
|  |  | all files that include file1.h |

TABLE 2-continued

| Change | Case | Context |
|---|---|---|
|  | extern in file1.c | all files that mention F |
|  | extern in file1.h | file1.h |
|  |  | all files that include file1.h |
|  |  | all files that mention F |
| Name of Variable V | static in file1.c | file1.c |
|  | static in file1.h | all files that include file1.h |
|  | extern in file1.c | all files that mention F |
|  | extern in file1.h | all files that include file1.h |
|  |  | all files that mention F |
|  | local in scope S | scope S |
|  | local in macro M | all expansions of macro M |
| Name of Type T | in file1.c | file.c |
|  | in file1.h | file1.h |
|  |  | all files that include file1.h |
|  | in scope S | scope S |
|  | in macro M | all expansions of macro M |
| Name of Typedef T | in file1.c | file.c |
|  | in file1.h | file1.h |
|  |  | all files that include file1.h |
|  | in scope S | scope S |
|  | in macro M | all expansions of macro M |
| Name of Macro M | in file1.c | file.c |
|  | in file1.h | file1.h |
|  |  | all files that include file1.h |

TABLE 3

| Case | Context |
|---|---|
| static F/V to extern F/V in file1.c | all files that mention identifier F/V |
| static F/V to extern F/V in file1.h | all files that include file 1.h all files that mention identifier F/V |
| extern F/V to static F/V in file1.c or file1.h | all files that mention F/V |
| static or extern F/V, T/TD/M within file1.c | file1.c |
| static or extern F/V, T/TD/M within file1.h | file1.h |
| static F/V, T/TD/M file1.c to file2.c | file1.c file2.c |
| static F/V, T/TD/M file1.c to file2.h | file1.c file2.h all files that include file2.h |
| static F/V, T/TD/M file1.h to file2.c | file1.h all files that include file1.h file2.c |
| static F/V, T/TD/M file1.h to file2.h | file1.h file2.h all files that include file1.h all files that include file2.h |
| extern F/V file1.c to file2.c | file1.c file2.c .h files associated with file1.c and file2.c all files that mention F/V file1.c |
| extern F/V file1.c to file2.h | .h files associated with file1.c file2.h all files that include file2.h all files that mention DF/VP |
| extern F/V file1.h to file2.c | file1.h all files that include file1.h file2.c .h files associated with file2.c all files that mention F/V |
| extern F/V file1.h to file2.h | file1.h file2.h all files that include file1.h all files that include file2.h all files that mention F/V |

What is claimed is:

1. An automated method, performed by a digital computer, for interactively planning, changing and maintaining software programs composed of constructs, programs and files on interrelated modular architectural, language and text documentation levels, each of which is accessible and displayable as a separate view level through an object-oriented system, wherein a change made on one level automatically informs the operator of and generates all necessary corresponding changes on other levels, comprising the steps of:

selecting a view level for display;

choosing a type of change from a class of changes associated with the selected view level;

specifying a desired change;

analyzing the impact of the specified change across all interrelated levels of the software to identify and display other additional changes necessitated by said specified change, if any, including:

recursively analyzing each identified additional change to further identify and display still other additional changes necessitated by the additional change and subsequent other additional changes, if any, at each view level, determining whether the specified change and any additional changes can be implemented without operator intervention, displaying for an operator a selection of choices for implementing first the specified change and then any additional changes if more than one way of implementing the specified change or any resulting additional changes is available, and requesting operator guidance when the computer is unable to perform the specified change or any additional changes; and implementing the originally specified change and any other changes necessitated as a result of said analysis on all view levels automatically without operator intervention.

2. The method of claim 1, wherein, when the name of a procedure is specified to be changed, analyzing includes the following steps:

checking for name conflicts in a defining module;

generating a list of all calling modules;

checking for name conflicts in each of the calling modules;

changing the name at the definition site;

changing the name at each declaration site;

changing the name at each call site; and changing the name in each import/export specification.

3. The method of claim 1, wherein, when the location of a procedure is specified to be changed, analyzing includes the following steps;

checking for a name conflict in the new file;

moving the definition from the old file to the new file;

checking for visibility of the procedure to callers;

checking the accessibility of resources used by the procedure in the new file; and moving the declaration from the old file to the new file.

4. The method of claim 1, wherein, analyzing at the language level includes for each object determining at what levels that object is visible, whether an identifier for an object is reusable, whether a separate declaration for the object is possible, whether there is a restriction on the location of the object, and whether and how the object may be shared across different files in a program.

5. The method of claim 1, wherein analyzing for any specified or additional change includes determining whether there is an illegal location or illegal identifier name;

whether the used resource is no longer accessible, ambiguous or different;

whether an object becomes inaccessible to users;

whether two objects with the same name become accessible to users and how they differ from each other;

whether object names conform to the naming convention; and whether the relationship between text comments and code should be altered or deleted as a result of the change.

* * * * *